United States Patent [19]
Wallis

[11] 3,851,863
[45] Dec. 3, 1974

[54] METHOD AND APPARATUS FOR PRE-CONDITIONING SOLID PARTICLE RESIN MATERIAL FOR PLASTIC FORMING

[76] Inventor: Marvin E. Wallis, 20741 Horace St., Chatsworth, Calif. 91311

[22] Filed: Aug. 31, 1972

[21] Appl. No.: 285,238

[52] U.S. Cl............... 259/191, 259/DIG. 18, 259/4, 264/176 R, 264/349, 425/379
[51] Int. Cl............................................. B29b 3/02
[58] Field of Search........... 259/191, 192, 193, 4, 9, 259/10, 60, DIG. 18, 6, 185; 425/144, 379; 264/88, 102, 176 R, 323, 349

[56] References Cited
UNITED STATES PATENTS

| | | | |
|---|---|---|---|
| 1,375,623 | 4/1921 | Bartels | 259/191 X |
| 1,522,386 | 1/1925 | Parsons et al. | 259/9 X |
| 2,469,999 | 5/1949 | Stober | 259/6 X |
| 3,246,883 | 4/1966 | Ashbrook | 259/4 X |
| 3,354,250 | 11/1967 | Killoran et al. | 425/379 X |

FOREIGN PATENTS OR APPLICATIONS

| | | | |
|---|---|---|---|
| 22,067 | 3/1917 | Denmark | 259/DIG. 18 |

Primary Examiner—Harvey C. Hornsby
Assistant Examiner—Philip R. Coe
Attorney, Agent, or Firm—Watts, Hoffman, Fisher & Heinke Co.

[57] ABSTRACT

A process for extruding plastic film or otherwise forming plastic parts is disclosed in which a liquified plastic resin is initially prepared from a starting material of solid resin particles. These resin particles are first partially liquified by conventional means such as in a screw ram extruder equipped with heating devices. A highly viscous fluid output intermixed with some partially melted semi-solid resin particles is forced by the pressure of the extruder through one or more heated conditioners constructed to substantially liquify the remaining partially melted particles. Each of these conditioners is formed of a housing for receiving the partially liquified particles under pressure and a plurality of spaced parallel plates arranged therein in a stack so as to present free space separations between adjacent plates through which the liquid and semi-solid particles are forced. During passage between the plate faces the unmelted solids are flattened and thereby disposed in a geometrical configuration conducive to complete melting of the semi-solids. Following these conditioners the liquid resin is removed of moisture and extraneous gas occluded therein by flowing the liquid over a knife edge disposed in a heated chamber filled with inert gas. Periodically, the chamber is exhausted to remove the impurities dislodged by the internal pressure of the melt into the inert gas upon the emergence of the occluded moisture and gas into the inert gas environment which surrounds the knife edge.

9 Claims, 6 Drawing Figures

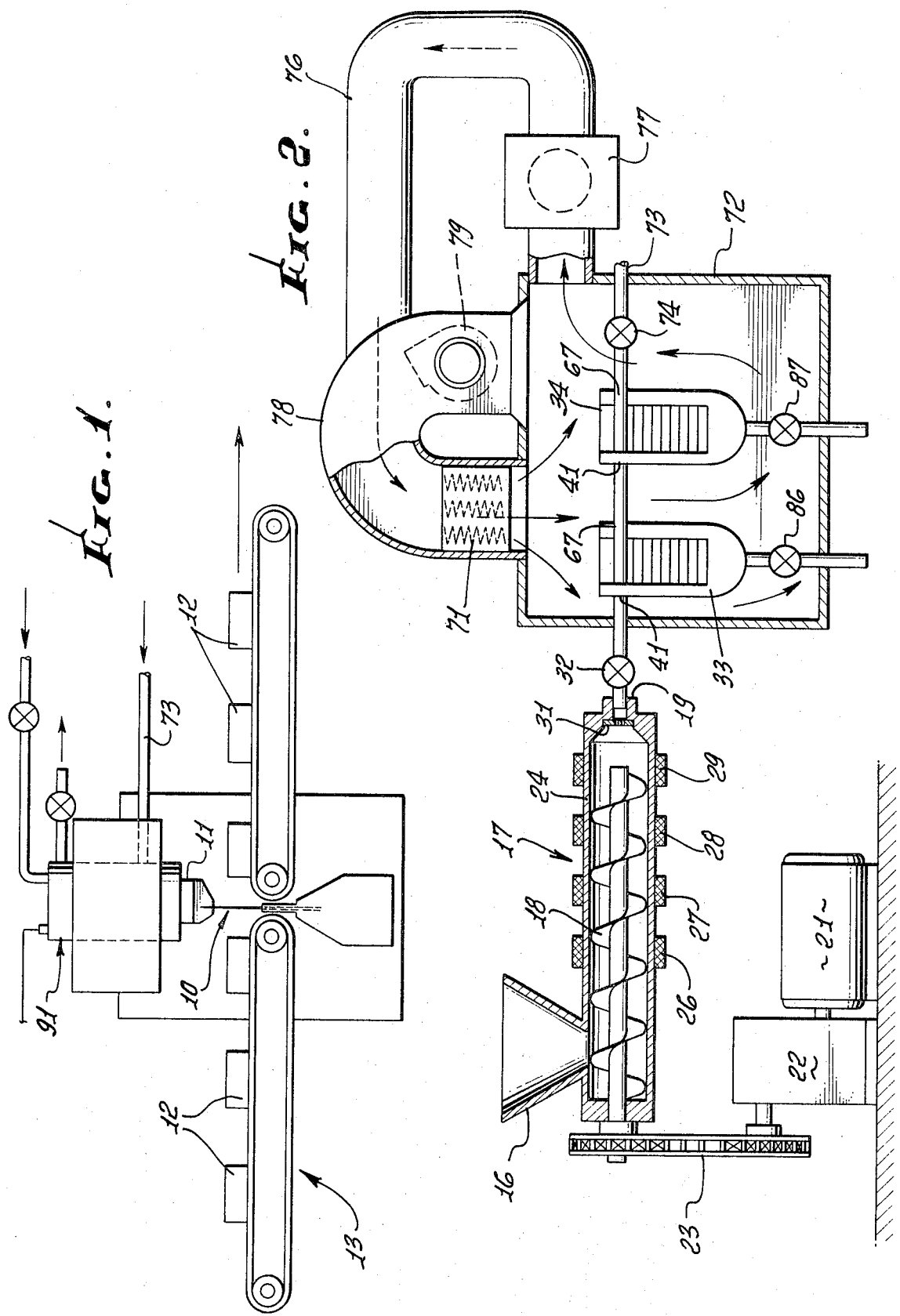

METHOD AND APPARATUS FOR PRE-CONDITIONING SOLID PARTICLE RESIN MATERIAL FOR PLASTIC FORMING

BACKGROUND OF THE INVENTION

This invention relates to plastic or resin forming techniques and equipment such as employed for the extrusion of plastic film and injection and blow molding of plastic parts.

A common deficiency of presently available extruders is their inability to produce a homogeneous melt of plastic or resin material free of partially-melted semi-solids. These residual semi-solids are the result of incomplete melting or liquifying of a starting solid resin material generally available in the form of solid pellets or particles. The presence of these partially unmelted particles is particularly troublesome in processes where sheets or films of plastic are extruded in which case pinholes and other imperfections in the sheet result from these inclusions. In some situations the industry merely accepts these pinhole defects as an inherent characteristic of the process. In other cases, the problem is remedied by techniques based on doubling or tripling the film of plastic so as to close the pinholes in one sheet by overlying homogeneous portions of another sheet. This technique can involve merely placing two or three very thin sheets or films together and relying on static electricity to bond them or laminating additional layers of film to a foundation sheet. These operations not only add to the cost of the process because of the redundancy involved but also are to be viewed as merely cover-up techniques, not solutions to the underlying problem.

One of the difficulties in achieving a complete liquification of the solid pellets can be attributed to the relatively short time in which the granular resin starter material is processed in the extruder. The pellets may be as much as three-sixteenths inch to one-fourth inch in diameter when delivered to the extruder. To a certain extent the residual semi-solid plastic pieces are broken down at the output of the extruder by forcing them through a screen pack, which is a combination of a heavy metal plate, containing many holes and a stack of several small mesh screens and dies, under the high extruder pressure. However, there are always a few of these semi-solids, commonly known as "fisheyes" in the industry, that are not eliminated by these means. In their semi-solid state these "fisheyes tend to squeeze through the breaker plate, screen packs and dies showing up as a defect in the sheet or film of the finished product.

To a lesser extent, injection and blow molding processes are also adversely affected by the inability of suitable equipment to fully melt the plastic resin. A complete liquification of the resin is necessary in order to force it through the small orifices and canals that feed the molds. Under these circumstances unusually high pressures are required in forming parts and these high pressures necessitate the use of expensive heavy-duty molds or dies. Even with these high pressures and special dies it is common to end up with finished products that exhibit "stress" weaknesses, and which are because of this, inferior products.

In partial answer to these problems, the industry has developed a device called a reciprocating ram extruder. With this machine, pellets are fed into the screw the same way as in the case of the conventional extruder. However, in the reciprocating extruder the screw works the pellets forward, then reverses and backs over these same pellets to re-work them, and finally changes direction again forcing the re-worked pellets under pressure into a small reservoir. On the third cycle, the melted resin in the reservoir is forced under high pressure into the die as the extruder is being filled with another shot of plastic pellets. Notwithstanding this triple working, the plastic is still not fully melted; although it is superior to the standard one-pass extruder. Tests performed on the melted resin with a well-known commercial reciprocating ram injection molder established the incompleteness of this melting operation. Similarly, tests on the standard one-pass extruders show an incomplete liquification.

In my issued U.S. Pat. No. 3,619,860, conditioning of the partially-liquified plastic resin is achieved by prolonged heat soaking in large vessels under controlled heat methods described therein. This method, although providing a homogeneous melt, did not result in a continuous process. For commercial applications, continuous operations are of course desirable. Furthermore, some gradual decomposition or degradation of the heated plastic occurred as a result of the long heat soaking period necessary to make a sufficient amount of plastic fluid for producing a suitable sheet of plastic or practical temperatures and pressures.

It is thus observed that a need exists for more efficiently liquifying the solid resin particles in plastic-forming processes. In the past, the inability of existing techniques and equipment to accomplish this objective have resulted in imperfections in the resulting plastic parts. Previous attempts to overcome this problem, such as by increasing operating temperatures and pressures, have spawned new problems and disadvantages.

Another shortcoming of available equipment for conditioning or preparing the liquid resin lies in the lack of efficient and economical devices for removing moisture and extraneous gas impurities that can be present in the melt. Such inclusions if not removed cause imperfections in the plastic parts, particularly sheet film. Previous means for removal have required special and expensive sections in the ram extruder for applying a vacuum to the resin.

INTRODUCTION TO THE INVENTION AND ITS OBJECTIVES

Accordingly, it is a principal object of the present invention to provide method and apparatus for more efficiently and completely conditioning the solid resin particles used as a starter material in plastic forming equipment and processes.

It is a further object of the present invention to provide a more efficient liquification method and apparatus without requiring the high operating temperatures and pressures typically essential in present commercial plastic extruders and molders.

A still further object of the present invention is to provide this more complete liquification of the plastic or resin particles by method and apparatus capable of either continuous or intermittent operation.

An additional object of the invention is to provide an efficient and economical apparatus and method for removing moisture gas and/or impurities from the liquified resin prior to forming the plastic film or part.

These objects are achieved in the present invention by method and apparatus for forcing partially liquified resin particles, such as pre-processed in a conventional screw extruder, or molder, through separations formed by a plurality of closely spaced metal plates. These plates are preferably disposed in a metal housing or chamber and arranged so that the partially liquified particles are forced under the pressure developed by the extruder into the chamber, through the plate separations, and out a discharge port extending from the housing to the plastic-forming equipment downstream therefrom. Simultaneously with passage of the fluid and semi-solids through the stack of parallel spaced plates, heat is applied to the chamber so as to heat the plates and the resin passing through the separations therebetween. The combined effects of forcing the partially melted semi-solid resin particles between the closely spaced plate surfaces and the additional heating at the metal plates results in substantial liquification of these previously unmelted particles or "fisheyes." In cases where moisture nad other gas impurities exist in the melt, the output from the conditioner is flowed over a knife edge in a chamber filled with inert gas to remove the impurities. Periodically the gas in this degassing and moisture removal chamber is exhausted along with impurities dislodged by pressure and heat as the plastic flows over the knife edge. A homogeneous viscous plastic or resin fluid highly suited for plastic forming operations such as plastic film extrusion and molding is the result.

These and further objects and various advantages of the conditioning method and apparatus according to the present invention will become apparent to those skilled in the art from a consideration of the following detailed description of an exemplary embodiment thereof. Reference will be made to the appended sheets of drawings in which:

BRIEF DESCRIPTION OF THE DRAWINGS

FIG. 1 is a side elevation view of a plastic film forming machine for packaging articles passed through the extruded film on a conveyor.

FIG. 2 is a side elevation view, partially in section, of a conventional screw extruder in combination with the apparatus for conditioning the partially liquified output from the extruder to form the homogeneous fluid, absent the inclusion of unmelted resin particles.

DESCRIPTION OF THE PREFERRED EMBODIMENT

Figure 3:
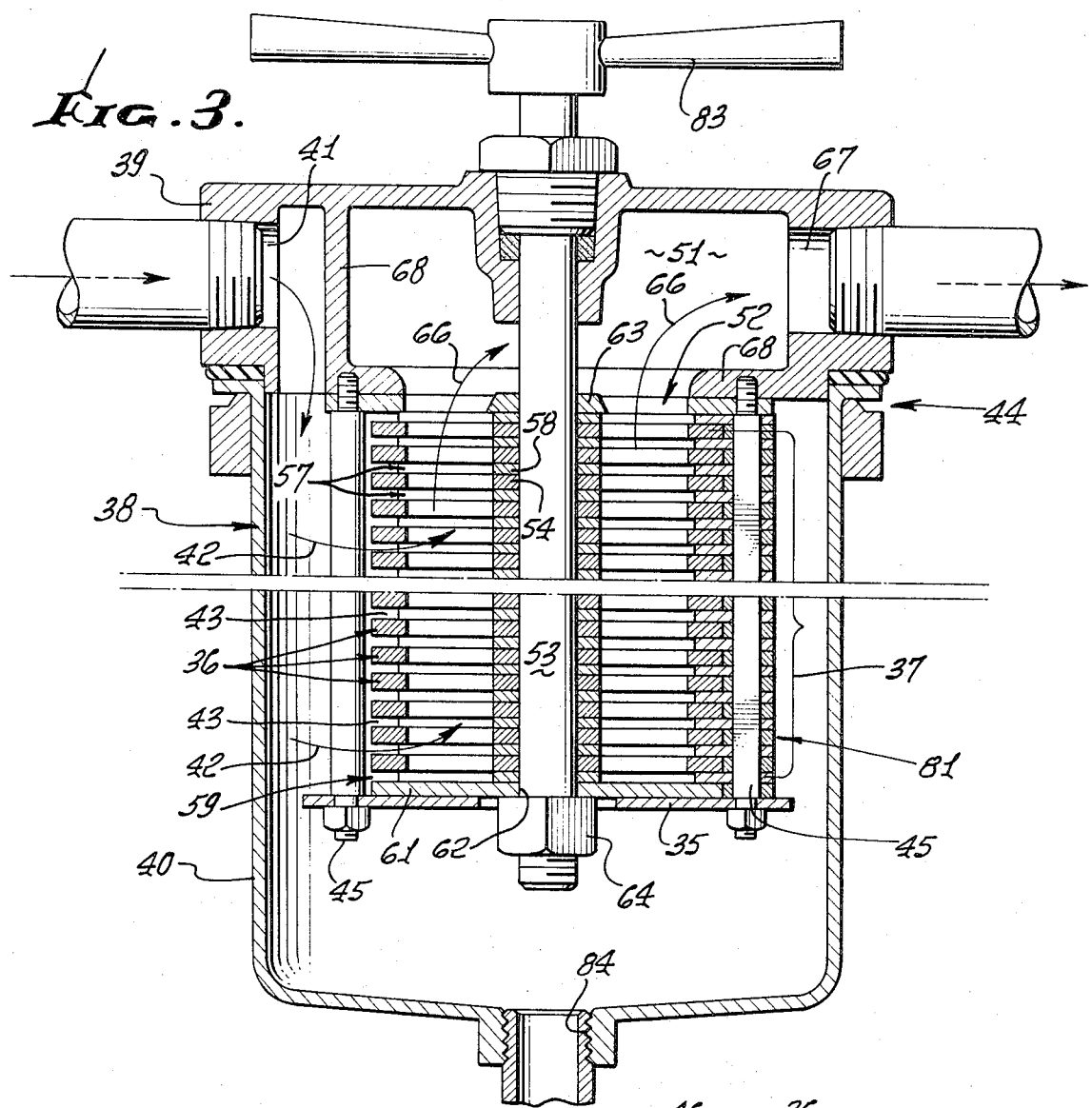
FIG. 3 is an enlarged view, partially in section, of one of the conditioners used in the conditioning apparatus of FIG. 2.

The present invention provides apparatus and method for preparing a properly-conditioned liquified plastic resin for delivery to a plastic forming machine such as illustrated in FIG. 1 in which a sheet or film 10 of resin is extruded and projected from a head 11 to apply a plastic sheet covering to each of the articles 12 carried along conveyor 13 as shown. In this instance, the film forming machine of FIG. 1 is of the type disclosed in my copenidng U.S. Application Serial No. 285,140 filed Aug. 31, 1972 and entitled Automatic packing method and apparatus, and Ser. No. 286,116 filed Sept. 5, 1972 and entitled "Film Forming Head." However, the present invention is suitable for use in conjunction with a variety of plastic extrusion and forming processes and equipment including injection and blow molding of plastic parts.

With reference to FIG. 2, conditioning of the resin material for delivery to the film forming machine starts with an initial step of melting of solid resin material, which is supplied by the manufacturers in a granular form of solid pellets or particles. The resin pellet material may be a plastic polymer or copolymer, also referred to as thermosetting or thermoplastic resins. For the purpose of the present disclosure, the term resin will be used in reference to all types of polymers and copolymers. Although the initial melting step is here performed by a screw extruder, other extruders, such as the ram, reciprocating ram and back extruders and other melting means such as by batch melting may be used in conjunction with the invention. The raw resin pellets are dumped into a hopper 16 of a screw type extruder 17 whereupon a screw 18 works the resin particles toward an output end 19. Screw 18 is driven by motor 21 through a reduction gear drive 22 and chain 23 as illustrated. Encircling a barrel 24 of the extruder are a plurality of band resistance heaters 26, 27, 28 and 29 for applying heat through the barrel 24 to the granular resin material as it is being worked by screw 18. Screw extruders such as extruder 17, equipped with heaters such as band heaters 26–29 are conventional and widely used for the purpose of converting raw plastic pellets into various finished plastic products.

The conditioning apparatus and method in accordance with the present invention functions in combination with this known device; although extruder 17 is operated somewhat differently that standard practices. Particularly, the amount of heat applied by the band heaters is reduced thus lowering the temperature of barrel and screw and the resulting plastic melt. Standard procedures generally require high temperatures applied to the barrel of the extruder and this operation must be monitered carefully and extreme care taken so there is no stoppage of pellet flow or the plastic will burn and stick to the insides of the barrel. However, this reduction in temperature is practical and permitted by reason of the more efficient conditioning apparatus and processes provided by the present invention downstream of extruder 17. For a typical resin material, it has been possible to provide a temperature of approximately 275°F. within barrel 24 adjacent band 26 and gradually increasing the barrel temperature to approximately 350°F. adjacent band 29 which corresponds to the output temperature at end 19 of the extruder.

Temperature reduction in the extruder avoids possible decomposition of the resin material whereas such decomposition is a likely result at the higher temperatures required with available equipment. Another advantage as indicated above, is realized in that by operating extruder 17 at lower temperatures, it is possible to shut down the equipment without burning the imobolized material therein. When burning occurs in conventional processes, caused by an abrupt shutdown the extruder while still at the higher operating temperatures, it is necessary to clean the screw and interior barrel walls by purging the system thoroughly before starting up again.

Another variation in the use of extruder 17 in accordance with the present invention concerns the elimination of a screen pack at the output end 19. Such screen packs together with a breaker plate 31 are employed in conventional extruders to create back pressure and help break down the solid and semisolid solid resin particles by forcing these particles through a series of screens at the output end. They also act as a filter and become clogged easily and necessitate shutdown for cleaning. However, as mentioned above, it has been found that such screen filtering does not eliminate all of the semi-solids as these particles are somewhat resilient and tend to squeeze through the screen mesh and the like. After passing through the mesh many of the particles regain their initial configuration and in processes now in commercial use continue downstream to appear as a defect in the extruded, injected or molded part or cause clogging of dies. In film forming machines such as in FIG. 1 the presence of these semi-solids is critical. As will be seen, the use of the normal screen pack is unnecessary in accordance with the present invention; only a breaker plate is used. However, screen packs in conjunction with the breaker plate may be retained at output end 19 of the extruder if desired.

As a result of the processing by screw 18 and heaters 26–29 a liquified, highly viscous resin is forced out of output end 19 which contains unmelted particles of plastic. Output end 19 includes a perforated breaker plate 31 for producing a backpressure on the extruder. The resin flows through a check valve 32 and into a pair of serially cascaded, heated conditioners 33 and 34 provided in accordance with the present invention. Although two serially connected conditioners 33 and 34 are employed in this instance to provide a preferred result, it is possible to employ only one or more than two conditioners depending on the circumstances. As the resin material emerges from extruder 17 it is at a moderate temperature and is highly viscous. Included in the fluid are many semi-solid unmelted resin particles resulting from the inefficient and thus partial liquification operation of extruder 17.

Figure 4:
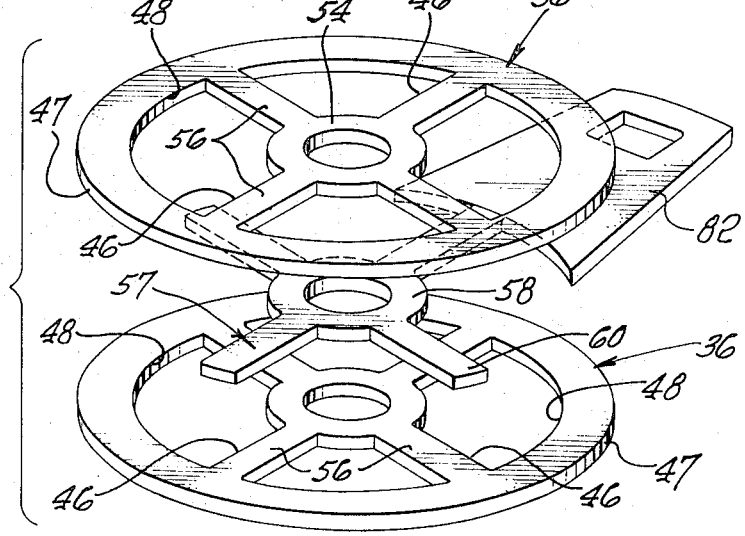
FIG. 4 is an enlarged perspective view of several of the components taken from the conditioner shown in FIG. 3.

Each of conditioners 33 and 34 is constructed to receive and flatten these semi-solid particles so as to dispose them in a geometrical configuration conducive to complete melting. For this purpose, each conditioner is comprised as shown in FIGS. 3 and 4 of a plurality of closely spaced plates 36, preferably and as shown having a circular shape, and being arranged in a cylindrical stack 37 and co-axially disposed within and spaced from a closed cylindrical chamber or housing 38. Plates 36 are arranged within housing 38 such that the partially liquified resin received under pressure at an intake 41 of housing 38 is forced as indicated by arrows 42 into a region surrounding stack 37 and through separations 43 defined by confronting parallel planar faces of adjacent plates 36. For this purpose, plates 36, are preferably circular and are provided with openings 46 interiorly of the outer circumferential edges 47 of each plate. In stack 37, the openings 46 of each plate are in registration with one another and in communication with a discharge chamber 51 at an upper axial end 52 of the stack. Plates 36 are disposed and supported in the stacked array by a central spindle 53 passing co-axially through plate hubs 54 connected to the outer circumferential body pportions of each plate by spokes 56 as best shown in FIG. 4. A plurality of star spacers 57 are disposed between each adjacent pair of plates 36 with each spacer 57 including a hub 58 also disposed on spindle 53 and spokes 60 aligned with the plate spokes to provide separations 43. The plate openings 46 at a lower axial end 59 of stack 37 are closed by a solid plate 61 having a central opening 62 to mount on spindle 53 as shown. Means are provided for axially compressing and securing stack 37 including plate 61 on spindle 53, such as by a collar 63 at an upper portion of the spindle and a bolt 64 threaded to a lower portion thereof.

By this arrangement, separations 43 between adjacent plates 36 are provided for receiving the incompletely liquified resin about most of the outer circumferential edge portions of stack 37. The pressure developed at the output of extruder 17 causes a build-up of pressure surrounding the cylindrical stack 37 and thereby forces the fluid and unmelted semi-solids through separations 43 and into registering openings 46 of the stacked plates whereupon the viscous fluid flows upward under pressure into discharge chamber 51 as shown by arrows 66 and out discharge port 67. Discharge chamber 51 is isolated from intake 41 and from the remaining chamber portions of housing 38 by partition wall 68. The critical feature in the construction of conditioners 33 and 34 lies in the separations 43 between plates 36 and moreover in the distance which the semi-solid particles must travel to traverse the confronting faces of the plates defining these separations. As mentioned above, conventional techniques fail to completely melt the semi-solid "fisheyes" because these particles in their heated state exhibit a substantial degree of resiliency enabling them to squeeze through breaker plates and screen mesh. On the other hand, the stack of plates 36 including separations 43 therebetween provide between the outer circumferential edge 47 and the outermost edge 48 of openings 46 a substantial distance over which the semi-solids must pass while simultaneously undergoing a flattening deformation caused by the minute plate separations. Typically, the "fisheyes" at the outer edge of stack 37 have a diameter of around 0.01 to 0.08 inches. Preferably, separations 43 should be in the range of 0.001 to 0.01 inches for flattening these particles. The radial distance between outer edge 47 and the outermost radial edge 48 of openings 46 should be the same circumferentially about each of plates 36 and preferably should be within the range of one-tenth to one-half of an inch or stated differently, 10 to 50 times the plate separations. the greater distance over which the particles must travel while between the plate faces defining separations 43 the better the result. The limitation is of course the amount of pressure which can be employed in forcing the partially liquified particles through increasingly greater distances. Insofar as a minimum distance is concerned, it is believed that this radial travel dimension should be at least two to three times the diameter of the semi-solid "fisheyes."

At the same time that the incompletely or partially liquified particles are being forced through the plate separations of the conditioners, heat is applied to each of conditioners 33 and 34. As shown in FIG. 2, this is accomplished by circulating air, heated by heating elements 71 into an enclosure 72 in which conditioners 33 and 34 are disposed, whereby this heated air increased the temperature of the conditioner housing and plates 36 therein. Preferably housing 38 for each of conditioners 33 and 34 is formed of aluminum which is a good heat conductor and transmits the heat from the surrounding air to the partially liquified resin material therein. All of the components in the conditioners such as plates 36, spindle 53, spacers 57, etc. are preferably formed of stainless steel to withstand chemical attacks by the heated resin.

Heating of plates 36 is partially due to the absorption by the metal material of heat from the surrounding resin and partly due to conduction of heat from the housing 38 through the interconnecting metal parts. Also, additional heat is generated by the shearing of the semi-solids as they encounter the plate edges leading to separations 43 and by the pressure forcing the melt through the plate separations.

As the resin material itself is a poor heat conductor, the heating of plates 36 by the mechanisms above stated is very important to accomplish the complete liquification of the semisolid particles passing through separations 43. The combined effects of the heat carried by plates 36 and the flattening of the particles by separations 43 is believed responsible for the substantially complete melting of these particles as they pass through the conditioners. The flattening disposes the semisolids in a thin geometrical configuration through which the heat in the surrounding melt and from plates 36 can readily penetrate to complete the melting process. Thus, and as stated above, the greater the distance which these particles must traverse in their flattened condition, the greater the efficiency of the melting process.

This circulation of the plastic through the conditioners further provides a mixing action which improves extrudability; because of high viscosity it is impossible to mix plastic in the liquid phase.

The heated air circulating about and in contact with conditioners 33 and 34 is in the present process adjusted to reach approximately 410°F. which will produce a 400°F. to 405°F. resin. A homogeneous liquified resin at this temperature will emerge from output conduit 73 communicating with the discharge port of conditioner 34 through a check valve 74.

The air is re-circulated in a closed circuit by a return duct 76 including a four-way damper 77 which dumps the return air into a blower chamber 78 including a motor driven blower 79. Typically, a 2-hour warm-up period will be required to bring the resin material to the 400°F. temperature.

In providing conditioners 33 and 34 I have used a commercially available edge type filter manufactured by the Cuno Engineering Corporation, Meriden, Conn., as their Auto-Klean device equipped with their type GP cartridge filter housing. This commercially available type filter is designated to remove solids by entrapment at the outer circumferential edges or within the separations between the filter plates. Such devices have not been used, so far as I am aware, in the manner contemplated by the present invention. This edge-type filter which I use comes equipped with a stationary cleaning blade stack indicated at 81 in FIG. 3 consisting of a plurality of radially inwardly extending blades such as blade 82 in FIG. 4 each having a radially inward edge extending between the faces of plates 36. Stack 37 may be thus rotated relative to cleaning blade stack 81 so as to remove collected solids from edges 47 of the plate and to a certain extent from between the separations 43. Rotation of stack 37 is effected by a manually engageable handle 83.

Housing 38 is formed of a head 39, defining intake 41 and discharge port 67 and supporting handle 83 and spindle 53, and a sump 40 attached and sealed to head 39 by assembly 44 as shown. Stack 37 rotatably rests on a stationary plate 35 secured to head 39 by tie bolt assemblies 45 and having a central opening through which the lower portion of spindle 53 and nut 64 pass freely.

These devices are also equipped with a drain opening 84, to which I connect sump valves 86 and 87 to conditioners 33 and 34 respectively as shown in FIG. 2 for occasionally cleaning the conditioners. Cleansing when necessary is accomplished by purging the discharge side of the plates, that is through discharge port 67 as shown in FIG. 3 with pre-heated nitrogen or carbon dioxide gas. Cleaning can also be achieved by other suitable means.

Since the internal parts of the conditioners, and the conduits and valves must be maintained in an oxygen free closed system they are not drained, except when it becomes necessary to purge the system. Therefore, at the end of a day's run, the heat on the resin can be turned down or off. The four-way damper 77 is then turned to allow ambient air to enter the air circulating system, while hot air is exited, to provide rapid cooling and thus prevent breakdown of plastic from being exposed to heat for an excessive period of time.

Figure 5:
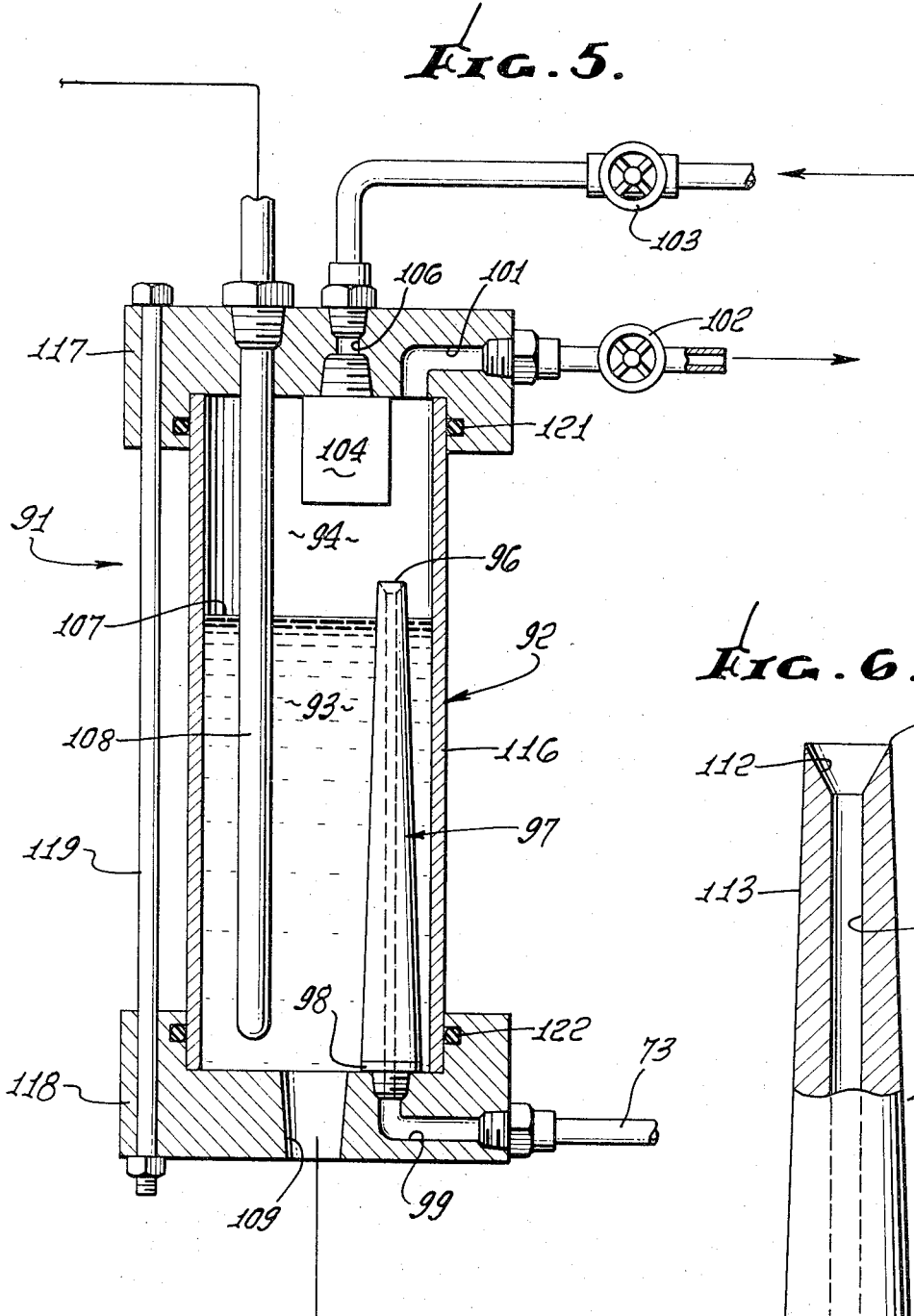
FIG. 5 is an enlarged cross sectional view of a pressure chamber equipped with a knife edge to assist in removing moisture and extraneous gas from the liquid resin, where this chamber is carried above the extrusion head of the machine shown in FIG. 1.

After processing by conditioners 33 and 34 the liquified resin may be fed via conduit 73 to a degassing and moisture removal chamber 91, in this instance overlying extruder head 11 of the plastic forming machine shown by the FIG. 1. With reference to FIG. 5, degassing and moisture removal chamber 91 in the exemplary embodiment described herein also serves as a means for supplying heated viscous liquid resin to the film forming head 11 under substantially constant pressure as described in my U.S. Pat. No. 3,619,860. As disclosed therein, the liquified and viscous resin accumulated within a lower portion of a pressure chamber or vessel is forced outwardly from a bottom thereof to a film forming head, such as head 11, by applying a source of pressurized inert gas to an upper portion of the chamber. In FIGS. 1 and 5 of the present disclosure, degassing and moisture removal chamber 91 corresponds to the pressurization chamber of U.S. Pat. No. 3,619,860.

In accordance with the present invention and as disclosed in FIG. 5, chamber 91 is comprised of a metal housing 92, preferably of aluminum in which a lower portion of the chamber provides for the accumulation of liquified resin 93 and an upper region 94 of the chamber is adapted to be pressurized and exhausted with a gas inert with respect to the resin material. Disposed within the upper portion 94 of the chamber is a knife edge, here in the form of a sharpened annular edge 96 provided at the discharge end of an upstanding tubular member 97 mounted within housing 92. A lower end 98 of member 97 is coupled at the bottom of housing 92 to an inlet 99 for receiving the liquified resin from conduit 73 and providing for the upward flow of such resin toward the annular edge 96 at the upper and discharge end of the tubular member. As the fluid reaches the discharge end of member 97 it is exposed for the first time to an open chamber as it flows over sharpened edge 96 whereby moisture and other impurities such as gas inclusions are dislodged from the resin fluid as a result of pressure release. These impurities mix into the inert gas environment provided in the upper region 94 of the chamber. After each pressurization of the chamber, the inert gas which may be nitrogen or carbon dioxide, including the intermixed moisture and gas impurities from the resin, is exhausted down from a high pressure to allow pressure to escape outwardly through an exhaust port 101. Port 101 is selectively communicated to atmosphere through a solenoid operated exhaust valve 102 connected to the port by suitable conduit means. Following this exhaust or venting mode, valve 102 is returned to its normally closed condition and upper portion 94 of chamber 91 remains pressurized at a relatively low pressure such as 50—100 psi.

A porous diffuser 104 is located within upper region 94 of the chamber and is connected to a valve 103 through suitable conduit means and through an intake passage 106 to an upper portion of housing 92. Diffuser 104 is employed to avoid absorption of gas within liquid resin 93 by reason of an abrupt jet of gas on the surface 107 of the accumulated liquid resin, otherwise caused by the opening of valve 103. A capacitance probe 108 functioning in combination with known instrumentation (not shown) provides for maintaining the level of the upper surface 107 of liquid resin 93 below the discharge end of member 97 and for operating the extruder 17 to fill chamber 91 when the resin therein is being processed so as to maintain the resin level above a certain low point.

In the illustrated embodiment and as stated above, chamber 91 here also serves as a means for supplying the liquified resin to the film forming head 11 of the apparatus shown in FIG. 1. For this purpose, a lower end of housing 92 is provided with an outlet opening 109 which is in communication with head 11 via a control valve that is built into head 11 (although not shown here). During operation of the film forming machine shown in FIG. 1, articles 12 are arranged on conveyor 13 to be packaged in groups or singularly each group being separated by empty spaces on the conveyor to provide intervals of time for manual loading. As a group of articles 12 approach film former head 11, the level of plastic resin 92 has reached a maximum, approximately at the level of surface 107 shown in FIG. 5. Thereupon the film former head valve and solenoid valve 103 are automatically opened and the gas pressure within upper region 94 of the chamber is increased to 300–1,000 psi, so as to force resin 93 outwardly through opening 109 and from there through the control valve in film forming head 11 for extruding and projecting film 10. Simultaneous movement of articles 12 along conveyor 13 causes this film to be intercepted by each of the articles in succession, so as to form a package in which a thin plastic sheet envelops each of the articles.

Resin 93 in chamber 91 should be maintained at a properly high temperature, such as the 4000°F. for the present embodiment, and for this purpose enclosure 72 may be arranged along with conditioners 33 and 34 above the machine in FIG. 1 so as to encompass and heat housing 92 also.

Figure 6:
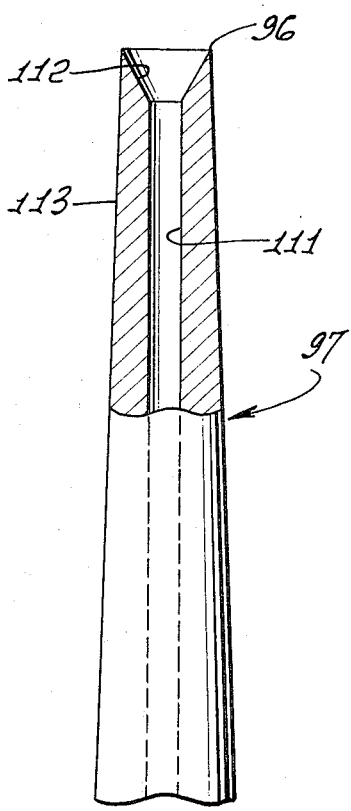
FIG. 6 is a further enlarged cross sectional view of the knife edge at the end of an upstanding tapered tube shown in FIG. 5.

Here, tubular member 97 is provided with a central passage 111 having an outwardly upwardly flared end portion 112 as best shown in FIG. 6. The outer circumferential wall 113 of tubular member 97 is longitudinally tapered to slope upwardly and inwardly, intercepting flared end portion 112 at knife edge 96. In this manner, as the liquified resin emerges into the gas environment over the sharpened edge 96, causing dislodgment of the various impurities, and flows smoothly downwardly on tapered wall 113 of member 97 to accumulate in the lower portion of the chamber. During filling of the chamber the relatively low inert gas pressure, e.g. 50–100 psi, gradually increases to a slightly higher pressure.

In the manner hereinabove described, moisture and gas inclusions are eliminated from the plastic-forming fluid thereby preventing pinholes, foaming, and other imperfections in the finished film. In the raw pellet form, the resin material is hydrocopic, susceptible to absorbing moisture and the moisture removal and degassing chamber of the present invention advantageously serves to prevent this moisture from reappearing as foam at the extruding head. It will be appreciated, that although this feature is particularly advantageous in plastic film-forming machines, it is also applicable to reduce defects in other plastic forming processes such as standard extruder, molders and blow molding machines.

Housing 92 is provided by a metal cylinder 116 and upper and lower rectangular metal caps 117 and 118 respectively, all preferably aluminum. A set of four tie-bolt assemblies on the corners of caps 117 and 118, one of which is shown as tiebolt assembly 119, secure caps 117 and 118 to cylinder 116. Sealing means, such as "O" rings 121 and 122 serve to seal the upper and lower ends of cylinder 116 to caps 117 and 118.

It is understood that the present invention has been disclosed by reference to a particular and preferred embodiment thereof, and modifications and design changes may be made to the disclosed embodiment without departing from the scope of the invention.

I claim:

1. In a plastic forming process requiring preparation of a liquified plastic resin from a starting material of solid resin particles and including the initial step of melting said particles by a process which results in an incompletely liquified resin containing some particles that are only partially melted, the improvement in combination therewith comprising the steps of: forcing the incompletely liquified resin and partially melted particles through separations defined by a plurality of closely spaced parallel plate faces formed of a heat conductive material, spreading or flattening the partially melted particles between the plates as the particles are forced through said separations, and simultaneously applying heat to said resin between the plates whereby conditioning of the resin material in this manner results in a substantially homogenous liquid resin.

2. The improvement in claim 1 further defined by forcing said liquified resin and particles through the separations provided between said plates from the outer circumference thereof into registering interior openings provided therein, while maintaining said plates stationary relative to one another and issuing the conditioned liquified resin from said registering openings.

3. The improvement of claim 2 further defined by disposing the plates in a heat conductive housing and forcing said liquified resin and particles through an intake passage into the housing and through said stacked plate separations and outwardly of a discharge port formed in said housing in communication with said registering plate openings, and said step of simultaneously heating comprising circulating heated fluid into contact with said housing.

4. In the method of claim 1 wherein the step of initially melting said particles includes processing said particles in a screw extruder equipped with heating means and the improvement in combination with said extruder comprising communicating an output of the incompletely liquified resin from said extruder to and for forcing said liquified resin and particles through the plate separations by the fluid force developed in said extruder.

5. In a method of pre-conditioning plastic resin in a plastic forming process including the step of liquifying solid resin particles to form a resin fluid, the improvement in combination with the liquification step comprising the steps of flowing said resin fluid into a pressure chamber over a knife edge disposed in an upper portion of such chamber and accumulating said fluid in a lower portion thereof, pressurizing the upper portion of said chamber with a gas inert with respect to said resin and periodically exhausting and repressurizing said chamber upper portion with such gas, whereby moisture and other impurities are dislodged at said knife edge into said gas and exhausted therewith.

6. In a plastic forming process requiring preparation of a liquified plastic resin from a staring material of solid resin particles and including the initial step of melting said particles by a process which results in an incompletely liquified resin containing some particles that are only partially melted, the improvement in combination therewith comprising the steps of: forcing the incompletely liquified resin and partially melted particles through separations defined by a plurality of parallel plate faces formed of a heat conductive material and spaced apart a distance less than the predominant size of the partially melted particles so that said particles are forcefully spread during passage between said plate faces, and simultaneously supplying heat to said plates, whereby conditioning of the resin material in this manner results in a substantially homogeneous liquid resin.

7. The improvement in claim 6 further defined by said step of forcing said particles through said separations over a travel distance of at least 10 to 50 times the separation of said plate faces.

8. In a plastic forming process requiring preparation of a liquified plastic resin from a starting material of solid resin particles and including the initial step of melting said particles by a process which results in an incompletely liquified resin containing some particles that are only partially jellted, the improvement in combination therewith comprising the steps of: forcing the incompletely liquified resin and partially melted particles through separations defined by a plurality of closely spaced parallel plate faces formed of a heat conductive material, simultaneously applying heat thereto, flowing the liquified resin subsequent to passage through said plate separations over a knife edge disposed in a pressure chamber, pressurizing said chamber with a gas inert with respect to said resin, and periodically exhausting and repressurizing said chamber with such gas, whereby moisture and other impurities are dislodged from the liquified resin at said knife edge into the gas and exhausted therewith, and conditioning of the resin material in this manner results in a substantially homogeneous liquid resin.

9. In an apparatus for pre-conditioning plastic resin for a plastic forming process of the type including means for delivering an incompletely liquified resin including some partially melted resin particles under pressure, the combination with said means comprising:

a conditioner for substantially completing the liquification of said particles having a housing provided with an intake connected to a delivery output of said means and having a discharge port, a stack of closely spaced parallel plates disposed in said housing and means for directing the incompletely liquified resin and particles received under pressure at the intake of said housing through separations defined by said spaced plates and out said discharge port; and means for heating said housing and the plates and resin material therein;

said conditioner housing being cylindrical and said plates being annular and disposed in a cylindrical stack mounted coaxially in said housing, said plates having registering openings interiorly of the outer circumferential edges thereof and said plate openings communicating with said discharge port at one axial end of said stack and being closed at the other end of said stack, said intake communicating with a chamber region defined by the inner wall of said housing and the outer circumferential edges of said stack, whereby the incompletely liquified resin and particles are forced into such chamber region and through the spacings of said plates from the outer circumferential edges thereof to the interior openings therein and from there the substantially completely liquified resin being forced out said discharge port.

* * * * *

PO-1050
(5/69)

UNITED STATES PATENT OFFICE
CERTIFICATE OF CORRECTION

Patent No. 3,851,863                    Dated  December 3, 1974

Inventor(s) Marvin E. Wallis

It is certified that error appears in the above-identified patent and that said Letters Patent are hereby corrected as shown below:

Column 4, line 6, "copenidng" should read -- copending --; lines 7 and 8, Automatic packing method and apparatus should be quoted and capitalized;
Column 9, line 63, "4000°F." should read -- 400°F. --

In the Claims:

Column 12, line 4, "jellted" should be -- melted --.

Signed and sealed this 4th day of March 1975.

(SEAL)
Attest:

RUTH C. MASON
Attesting Officer

C. MARSHALL DANN
Commissioner of Patents
and Trademarks